United States Patent
Tsai et al.

(10) Patent No.: US 10,585,501 B2
(45) Date of Patent: Mar. 10, 2020

(54) MOUSE WITH LOW FRICTION ROLLER MODULE

(71) Applicant: Primax Electronics Ltd., Taipei (TW)

(72) Inventors: Yung-Ming Tsai, Taipei (TW); Chun-Che Wu, Taipei (TW); Chun-Nan Su, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 214 days.

(21) Appl. No.: 15/830,743

(22) Filed: Dec. 4, 2017

(65) Prior Publication Data

US 2019/0073048 A1    Mar. 7, 2019

(30) Foreign Application Priority Data

Sep. 1, 2017 (TW) .............................. 106130016 A

(51) Int. Cl.
*G06F 3/0362* (2013.01)
*G06F 3/0354* (2013.01)
*G06F 3/03* (2006.01)

(52) U.S. Cl.
CPC .......... *G06F 3/0362* (2013.01); *G06F 3/0312* (2013.01); *G06F 3/03543* (2013.01)

(58) Field of Classification Search
CPC .... G06F 3/03543; G06F 3/038; G06F 3/0346; G06F 3/0317; G06F 3/033; G06F 3/016; G06F 3/0213; G06F 3/03549; G06F 3/0383; G06F 3/0362; G06F 3/0312; G06F 3/0485; G06F 3/0354; G06F 3/0395; G06F 2203/0384
See application file for complete search history.

(56) References Cited

U.S. PATENT DOCUMENTS

| | | | | |
|---|---|---|---|---|
| 6,100,874 A * | 8/2000 | Schena | ................... | G01B 5/008 345/157 |
| 6,353,429 B1 * | 3/2002 | Long | ................... | G01D 5/34738 345/158 |
| 7,042,441 B2 * | 5/2006 | Adams | ................... | G06F 3/0213 345/157 |
| 7,821,498 B2 * | 10/2010 | Kramer | ............... | G06F 3/03543 345/160 |
| 8,094,125 B2 * | 1/2012 | Hou | ...................... | G06F 3/0362 345/163 |
| 8,446,366 B2 * | 5/2013 | Blandin | .............. | G06F 3/03543 345/156 |
| 8,564,537 B2 * | 10/2013 | Peng | ..................... | G06F 3/0362 345/163 |
| 9,389,705 B2 * | 7/2016 | Young | ................... | G06F 3/0312 |

(Continued)

*Primary Examiner* — Dismery Mercedes
(74) *Attorney, Agent, or Firm* — Kirton McConkie; Evan R. Witt

(57) ABSTRACT

The present invention provides a mouse with a low friction roller module, including a mouse body and a low friction roller module; the low friction roller module is mounted in the mouse body and includes a support, a roller, a low friction bearing, a support shaft, and an encoding component; a mounting portion is provided in the roller; the low friction bearing is fastened in the mounting portion; one side of the support shaft passes through and is connected to the low friction bearing, and the other side of the support shaft passes through and is connected to the support; and the encoding component is connected to the roller. In this way, rolling friction force is reduced.

12 Claims, 4 Drawing Sheets

(56) References Cited

U.S. PATENT DOCUMENTS

| | | | | |
|---|---|---|---|---|
| 9,778,760 B1* | 10/2017 | Huang | ................ | G06F 3/03543 |
| 10,162,434 B1* | 12/2018 | Tsai | .................... | G06F 3/03543 |
| 10,496,189 B2* | 12/2019 | Tsai | ...................... | G06F 3/0362 |
| 2006/0001657 A1* | 1/2006 | Monney | ................ | G06F 3/0312 |
| | | | | 345/184 |
| 2014/0078062 A1* | 3/2014 | Chen | ................... | G06F 3/03543 |
| | | | | 345/166 |
| 2016/0041633 A1* | 2/2016 | Weng | ................. | G06F 3/03543 |
| | | | | 345/163 |

* cited by examiner

MOUSE WITH LOW FRICTION ROLLER MODULE

FIELD OF THE INVENTION

The present invention relates to a mouse with a low friction roller module.

BACKGROUND OF THE INVENTION

In a computer device or an electronic game device, a mouse is usually used to operate and display an electronic file and an application or perform a virtual game, and a roller of a mouse is usually used to scroll to pull content of a display screen.

A conventional mouse with a roller mainly includes a mouse body, a roller, a support, a support shaft, and an encoder. The roller, the support, the support shaft, and the encoder are provided in the mouse body. The roller is located between the support and the encoder. One side of the support shaft passes through and is connected to the roller and the other side thereof passes through and is connected to the support. One side of the roller, which is far away from the support, is connected to the encoder, so that when the roller is scrolled, the roller can rotate the encoder to pull the content of the display screen.

However, the support shaft of the conventional mouse with the roller directly passes through and is connected to the roller. Thus, when the roller is scrolled, an inner surface of the roller is in contact with an outer surface of the support shaft, causing friction. Thus, when the roller is scrolled, resistance is generated so that the roller cannot be scrolled for a long time and a user also needs to spend much strength scrolling the roller. Therefore, improvement is needed.

SUMMARY OF THE INVENTION

A main objective of the present invention is to provide a mouse with a low friction roller module.

In a preferred embodiment, the present invention provides a mouse with a low friction roller module, including a mouse body and a low friction roller module; the low friction roller module is mounted in the mouse body, and the low friction roller module includes a support, a roller, a low friction bearing, a support shaft, and an encoding component; the support is fastened in the mouse body; the roller is located on one side of the support and provided with a mounting portion in the middle; the low friction bearing is fastened in the mounting portion; one side of the support shaft passes through and is connected to the low friction bearing and the other side passes through and is connected to the support; and the encoding component is located on one side of the roller, which is far away from the support, and connected to the roller. In this way, friction force between the roller and the support shaft is reduced, thereby reducing rolling friction force.

Preferably, the low friction bearing includes an outer bearing and an inner bearing, and the outer bearing is sheathed on an exterior of the inner bearing, so that the inner bearing is in slip connection with an interior of the outer bearing, and an outer surface of the outer bearing is fastened to an inner surface of the mounting portion, and one side of the support shaft, which is far away from the support, passes through and is connected to the inner bearing and fastened in the inner bearing. Preferably, the outer bearing and the inner bearing are arranged in a concentric circle layout. Preferably, a rotational space is provided between the outer bearing and the inner bearing, the low friction bearing further includes a plurality of rolling assemblies, and the rolling assemblies are mounted in the rotational space at an equal interval. Preferably, the rolling assembly is a roll ball or a pin roller.

Preferably, the outer bearing and the inner bearing each are an assembly made of a magnetic material, and an inner surface of the outer bearing and an outer surface of the inner bearing have a same magnetism.

Preferably, the roller includes a center axis, the mounting portion is a circular slot provided on one side of the roller which is adjacent to the support by using the center axis as an axle center. Preferably, a coupling shaft extends from the side of the roller which is far away from the mounting portion by using the center axis as an axle center, and the coupling shaft is connected to the encoding component. Preferably, the low friction roller module further includes a bracket, and the bracket is located on the side of the roller which is far away from the support; and the bracket is located between the roller and the encoding component, and the coupling shaft is connected to the encoding component through the bracket. Preferably, the roller is located between the support and the bracket. In this way, when the roller is scrolled, no misalignment occurs.

Preferably, the mouse body includes a lower casing, bottoms of the support and the bracket are separately fastened to the lower casing, and the roller is located between the support and the bracket. Preferably, the low friction roller module further includes an in-roller key sensing assembly, and the in-roller key sensing assembly is located on one side of the support which is far away from the roller; and an extension section extends from one side of the support shaft which is far away from the roller, and the extension section passes through the support and abuts on the in-roller key sensing assembly. Preferably, the encoding component is an encoder and the in-roller key sensing assembly is a key sensor. Preferably, the mouse body further includes a circuit board, the circuit board is mounted in the lower casing, and the encoding component and the in-roller key sensing assembly are separately electrically connected to the circuit board and mounted on the circuit board.

DETAILED DESCRIPTION OF THE PREFERRED EMBODIMENT

Figure 1:
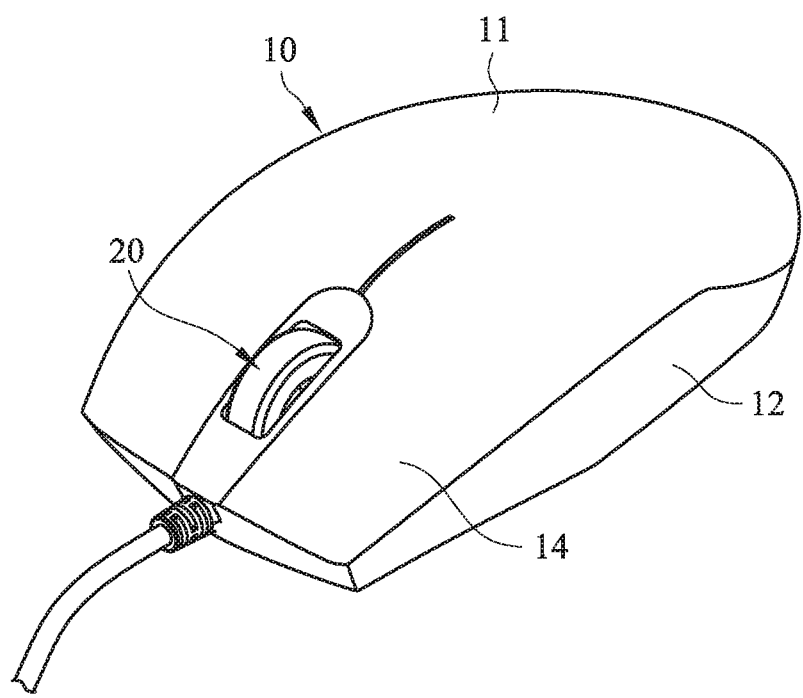
FIG. 1 is a three-dimensional diagram of a mouse with a low friction roller module of the present invention.
Figure 2:
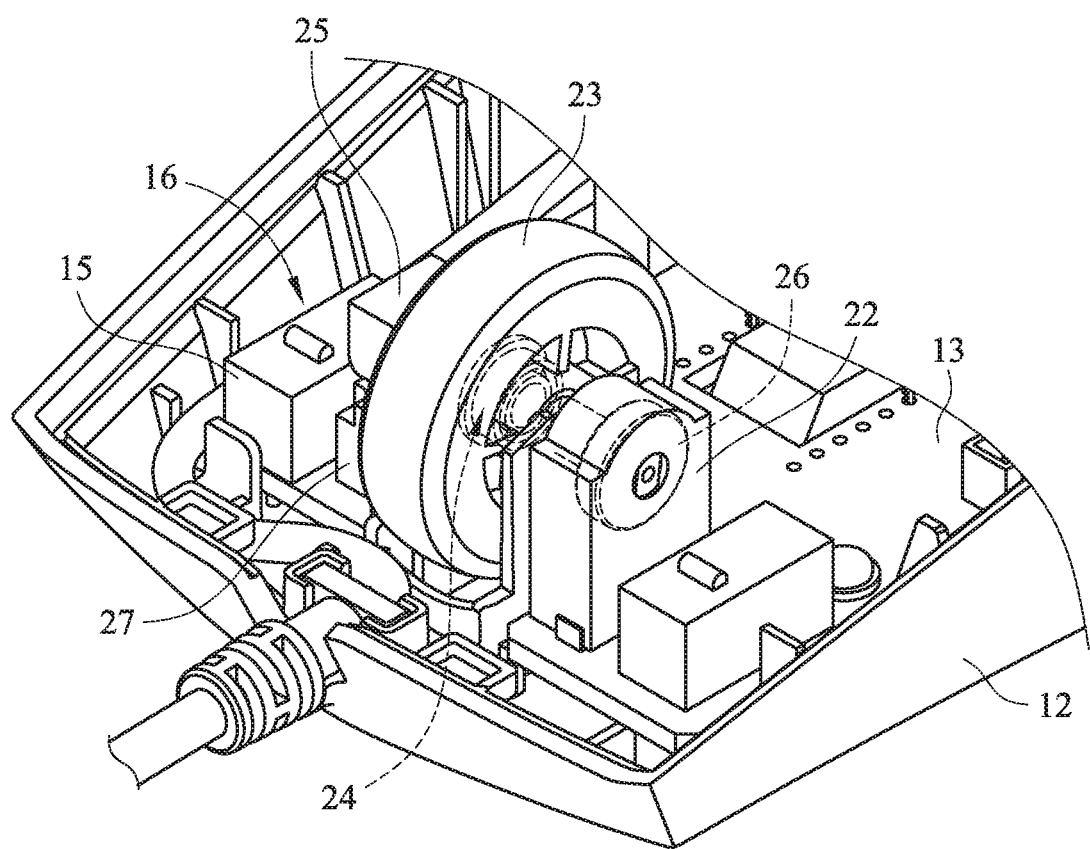
FIG. 2 is a schematic diagram of a mouse with a low friction roller module of the present invention.
Figure 3:
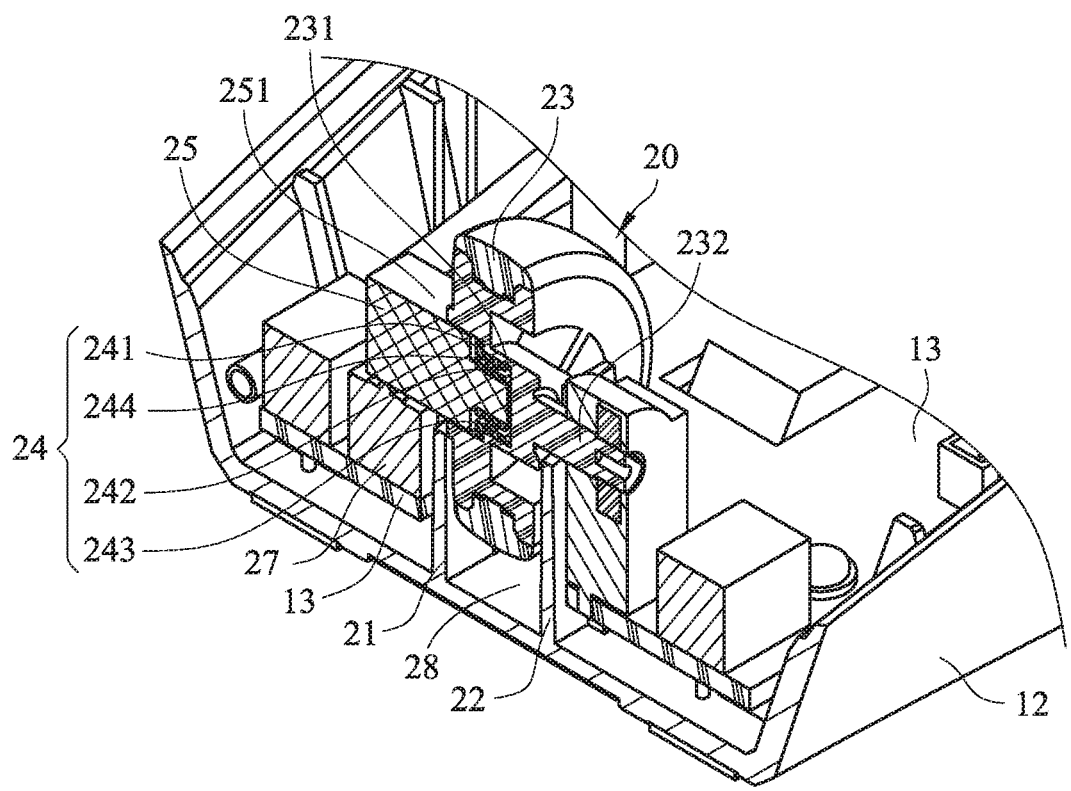
FIG. 3 is a cross section diagram of a mouse with a low friction roller module of the present invention.

Referring FIG. 1 to FIG. 3, FIG. 1 to FIG. 3 are a three-dimensional diagram, a schematic diagram, and a cross section diagram of a mouse with a low friction roller module of the present invention. A mouse 100 with a low friction roller module includes a mouse body 10 and a low friction roller module 20.

The mouse body 10 includes an upper casing 11, a lower casing 12, a circuit board 13, a pair of keys 14, and a pair of key sensing assemblies 15. The upper casing 11 corresponds to a cover cap of the lower casing 12, and an accommodation space 16 is formed between the upper casing 11 and the lower casing 12. The circuit board 13 is mounted in the accommodation space 16 and fastened on the lower casing 12. The pair of the keys 14 are separately disposed on the upper casing 11, the pair of the key sensing assemblies 15 are separately disposed in the accommodation space 16, and the pair of the key sensing assemblies 15 are separately fastened to the circuit board 13 and are electrically connected to the circuit board 13. Each key 14 is separately connected to each key sensing assembly 15.

The low friction roller module 20 is mounted in the accommodation space 16 of the mouse body 10. The low friction roller module 20 includes a support 21, a bracket 22, a roller 23, a low friction bearing 24, a support shaft 25, an encoding component 26, and an in-roller key sensing assembly 27.

Bottoms of the support 21 and the bracket 22 are separately fastened to the lower casing 12, and a mounting space 28 is formed between the support 21 and the bracket 22. The roller 23 is mounted in the mounting space 28, so that the roller 23 is located between the support 21 and the bracket 22. The encoding component 26 is located on one side of the bracket 22 which is far away from the roller 23, so that the bracket 22 is located between the roller 23 and the encoding component 26. The encoding component 26 is mounted on the circuit board 13 and electrically connected to the circuit board 13. The roller 23 includes a center axis, and a mounting portion 231 is provided on one side of the roller 23 which is adjacent to the support 21 by using the center axis [SYvivian1] as an axle center, and the mounting portion 231 is a circular slot. A coupling shaft 232 extends from one side of the roller 23 which is far away from the mounting portion 231 by using the center axis [SYvivian2] as an axle center, and the coupling shaft 232 passes through the bracket 22 and is connected to the encoding component 26. The encoding component 26 is an encoder, and the encoder may be a rotary encoder, an incremental optical encoder, an absolute optical encoder, or the like, but not limited thereto.

The low friction bearing 24 is fastened to the mounting portion 231, so that a center axis of the low friction bearing 24 and the center axis of the roller 23 are a same center axis. The low friction bearing 24 includes an outer bearing 241, an inner bearing 242 and a plurality of rolling assemblies 243. An outer surface of the outer bearing 241 is fastened to an inner surface of the mounting portion 231, so that the outer bearing 241 is fastened in the roller 23. The outer bearing 241 is sheathed on an exterior of the inner bearing 242, and the outer bearing 241 and the inner bearing 242 are arranged in a concentric circle layout, so that the inner bearing 242 is in slip connection with an interior of the outer bearing 241. A rotational space 244 is provided between the outer bearing 241 and the inner bearing 242, and the rolling assemblies 243 are mounted in the rotational space 244 between the outer bearing 241 and the inner bearing 242 at an equal interval. Each rolling assembly 243 is a roll ball or a pin roller, [SY3] so that a rolling assembly bearing is formed between the outer bearing 241, the inner bearing 242, and the rolling assemblies 243.

One side of the support shaft 25 passes through and is connected to the support 21, the other side of the support shaft 25 passes through and is connected to the inner bearing 242 and fastened in the inner bearing 242. The in-roller key sensing assembly 27 is located on one side of the support 21 which is far away from the roller 23, and the in-roller key sensing assembly 27 is mounted on the circuit board 13 and electrically connected to the circuit board 13, so that the support 21 is located between the in-roller key sensing assembly 27 and the roller 23. An extension section 251 extends from one end of the support shaft 25 which is far away from the roller 23, and the extension section 251 passes through the support 21 and abuts on the in-roller key sensing assembly 27[SY4]. When the roller 23 is pressed, the extension section 251 can be engaged to move downward and press the in-roller key sensing assembly 27, and the in-roller key sensing assembly 27 is a key sensor.

When in use, the roller 23 is scrolled first by using a finger and the coupling shaft 232 is engaged to rotate by using the roller 23, thereby rotating the encoding component 26, so that when the roller 23 is scrolled, effect of pulling a screen up and down can be displayed on a display screen.

In addition, the low friction bearing 24 is mounted in the roller 23, and the low friction bearing 24 is the rolling assembly bearing. Thus, when the roller 23 is scrolled, the inner bearing 242 of the low friction bearing 24 does not rotate with the outer bearing 241 and the plurality of the rolling assemblies 243 disposed between the outer bearing 241 and the inner bearing 242 scrolls with relative motion between the outer bearing 241 and the inner bearing 242, so as to reduce friction force between the outer bearing 241 and the inner bearing 242 and to further reduce friction force between the roller 23 and the support shaft 25 when the roller 23 is scrolled, so that the rolling friction force can be reduced. Moreover, a user can spend less strength scrolling the roller 23 to save labor and increase scrolling time of the roller 23.

Figure 4:
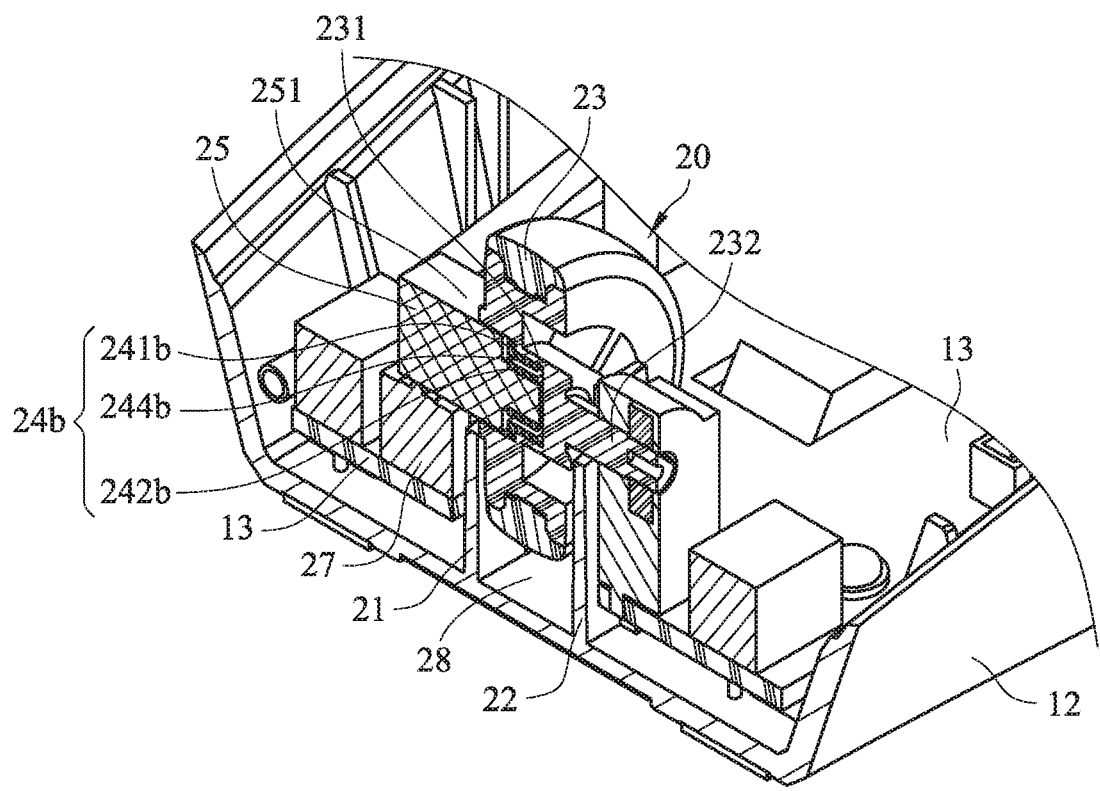
FIG. 4 is a cross section diagram of another embodiment of a mouse with a low friction roller module of the present invention.

Referring to FIG. 4, FIG. 4 is a cross section diagram of another embodiment of a mouse with a low friction roller module of the present invention. The main difference of this embodiment from the foregoing embodiment lies in replacing the low friction bearing 24 with a low friction bearing 24b. An outer bearing 241b and an inner bearing 242b of the low friction bearing 24b each are an assembly made of a magnetic material, and an inner surface of the outer bearing 241b and an outer surface of the inner bearing 242b have a same magnetism. Therefore, the low friction bearing 24b is a magnetic bearing.

Under the principle that a same magnetism generates a repulsive force, a rotational space 244b is generated between the inner bearing 242b and the outer bearing 241b because of repulsive magnetic force, so that the inner bearing 242b remains in a middle part of the outer bearing 241b. Thus, when a user applies force to scroll the roller 23 so that the outer bearing 241b is engaged to rotate by scrolling the roller 23, a distance is maintained between the inner bearing 242b and the outer bearing 241b because of the rotational space 244b between the outer bearing 241b and the inner bearing 242b, so that when the outer bearing 241b rotates relative to the inner bearing 242b, no friction is caused when the outer bearing 241b is in contact with the inner bearing 242b. Moreover, the friction force between the roller 23 and the support shaft 25 can also be reduced, thereby reducing the rolling friction, and saving the labor and increasing the scrolling time of the roller 23 when scrolling the roller 23.

In addition, center axes of the low friction bearings 24, 24b and the coupling shaft 232 and the center axis of the roller 23 are the same center axis. Thus, when the roller 23 is scrolled, no misalignment occurs, thereby avoiding friction or collision between the roller 23 or the coupling shaft 232 and the mouse body 10 to ensure that the roller 23 can scroll smoothly.

According to the above description, it can be learned that, first, the low friction bearings 24 and 24b are disposed in the roller 23 to reduce the friction force between the roller 23 and the support shaft 25, so that the user can spend less strength scrolling the roller 23 to save the labor and increase the scrolling time of the roller 23; and second, because the center axes of the low friction bearing 24, 24b and the coupling shaft 232 and the center axis of the roller 23 are the same center axis, no misalignment occurs when the roller 23 is scrolled, thereby ensuring that the roller 23 can scroll smoothly.

The above descriptions are merely preferred embodiments of the present invention, and are not intended to limit the patent scope of the present invention. Therefore, any equivalent change or modification completed without departing from the spirit disclosed in the present invention shall fall within the patent scope of this application.

What is claimed is:

1. A mouse with a low friction roller module, comprising:
   a mouse body; and
   a low friction roller module, mounted in the mouse body, the low friction roller module comprising:
   a support, fastened in the mouse body;
   a roller, located on one side of the support and provided with a mounting portion in the middle;
   a low friction bearing, fastened in the mounting portion, wherein the low friction bearing comprises an outer bearing and an inner bearing, and the outer bearing is sheathed on an exterior of the inner bearing, so that the inner bearing is in slip connection with an interior of the outer bearing; an outer surface of the outer bearing is fastened to an inner surface of the mounting portion, wherein the outer bearing and the inner bearing each are an assembly made of a magnetic material, and an inner surface of the outer bearing and an outer surface of the inner bearing have a same magnetism;
   a support shaft, one side of the support shaft passing through and being connected to the inner bearing and fastened in the inner bearing of the low friction bearing and the other side thereof passing through and being connected to the support; and
   an encoding component, located on one side of the roller, which is far away from the support, and connected to the roller.

2. The mouse with the low friction roller module according to claim 1, wherein the outer bearing and the inner bearing are arranged in a concentric circle layout.

3. The mouse with the low friction roller module according to claim 1, wherein a rotational space is provided between the outer bearing and the inner bearing, and the low friction bearing further comprises a plurality of rolling assemblies, and the rolling assemblies are mounted in the rotational space at an equal interval.

4. The mouse with the low friction roller module according to claim 3, wherein the rolling assembly is a roll ball or a pin roller.

5. The mouse with the low friction roller module according to claim 1, wherein the roller comprises a center axis and the mounting portion is a circular slot provided on one side of the roller which is adjacent to the support by using the center axis as an axle center.

6. The mouse with the low friction roller module according to claim 5, wherein a coupling shaft extends from the side of the roller which is far away from the mounting portion by using the center axis as an axle center, and the coupling shaft is connected to the encoding component.

7. The mouse with the low friction roller module according to claim 6, wherein the low friction roller module further comprises a bracket, and the bracket is located on the side of the roller which is far away from the support; and the bracket is located between the roller and the encoding component, and the coupling shaft passes through the bracket and is connected to the encoding component.

8. The mouse with the low friction roller module according to claim 7, wherein the roller is located between the support and the bracket.

9. The mouse with the low friction roller module according to claim 7, wherein the mouse body comprises a lower casing, bottoms of the support and the bracket are separately fastened to the lower casing, and the roller is located between the support and the bracket.

10. The mouse with the low friction roller module according to claim 9, wherein the low friction roller module further comprises an in-roller key sensing assembly, and the in-roller key sensing assembly is located on one side of the support which is far away from the roller; and an extension section extends from one side of the support shaft which is far away from the roller, and the extension section passes through the support and abuts on the in-roller key sensing assembly.

11. The mouse with the low friction roller module according to claim 10, wherein the encoding component is an encoder and the in-roller key sensing assembly is a key sensor.

12. The mouse with the low friction roller module according to claim 10, wherein the mouse body further comprises a circuit board, the circuit board is mounted in the lower casing, and the encoding component and the in-roller key sensing assembly are separately electrically connected to the circuit board and mounted on the circuit board.

* * * * *